US006954235B1

(12) United States Patent
Russell et al.

(10) Patent No.: US 6,954,235 B1
(45) Date of Patent: *Oct. 11, 2005

(54) SILICON-ON-SAPPHIRE DISPLAY APPARATUS AND METHOD OF FABRICATING SAME

(75) Inventors: Stephen D. Russell, San Diego, CA (US); Randy L. Shimabukuro, San Diego, CA (US); Bruce W. Offord, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/614,426

(22) Filed: Jul. 7, 2003

Related U.S. Application Data

(60) Continuation-in-part of application No. 09/880,660, filed on Aug. 3, 2001, now Pat. No. 6,617,187, which is a division of application No. 09/047,658, filed on Mar. 25, 1998, now Pat. No. 6,312,968, which is a continuation-in-part of application No. 08/301,170, filed on Sep. 1, 1994, now abandoned, which is a continuation-in-part of application No. 08/105,252, filed on Aug. 4, 1993, now abandoned, which is a continuation-in-part of application No. 08/094,541, filed on Jun. 30, 1993, now Pat. No. 5,300,443.

(51) Int. Cl.$^7$ .......................................... G02F 1/1343
(52) U.S. Cl. ..................................................... 349/38
(58) Field of Search .......................................... 349/38

(56) References Cited

U.S. PATENT DOCUMENTS

| 3,881,175 A | * | 4/1975 | Wanlass .................... 365/176 |
| 4,024,626 A | | 5/1977 | Leupp et al. |
| 4,177,084 A | | 12/1979 | Lau et al. |
| 4,509,900 A | | 4/1985 | Odawara |
| 4,615,762 A | | 10/1986 | Jastrzebski et al. |
| 4,694,347 A | | 9/1987 | Ito |
| 5,256,562 A | | 10/1993 | Vu et al. |
| 6,190,933 B1 | | 2/2001 | Shimabukuro et al. |
| 6,312,968 B1 | | 11/2001 | Shimabukuro et al. |
| 6,521,950 B1 | * | 2/2003 | Shimabukuro et al. ..... 257/350 |
| 6,617,187 B1 | * | 9/2003 | Shimabukuro et al. ....... 438/30 |

OTHER PUBLICATIONS

Merriam Webster College Dictionary, Tenth Edition, P457.*

* cited by examiner

Primary Examiner—Robert H. Kim
Assistant Examiner—Prasad R. Akkapeddi
(74) Attorney, Agent, or Firm—Andrew J. Cameron; Michael A. Kagan; Peter A. Lipovsky

(57) ABSTRACT

A liquid crystal display includes: a) a sapphire substrate having a first crystal lattice structure; b) a single crystal silicon structure having a thickness no greater than about 100 nanometers affixed to the sapphire substrate to create a silicon-on-sapphire structure, and a second crystal lattice structure oriented by the first crystal lattice structure; c) an array of liquid crystal capacitors formed on the silicon-on-sapphire structure; and d) integrated self-aligned circuitry formed from the silicon layer which is operably coupled to modulate the liquid crystal capacitors. The liquid crystals capacitors may include nematic or ferroelectric liquid crystal material.

17 Claims, 7 Drawing Sheets

SILICON-ON-SAPPHIRE DISPLAY APPARATUS AND METHOD OF FABRICATING SAME

CROSS REFERENCE TO RELATED APPLICATIONS

This application is a continuation-in-part of U.S. patent application Ser. No. 09/880,660 filed 3 Aug. 2001, entitled Method for Fabricating An Electrically Addressable Silicon-On-Sapphire Light Valve now U.S. Pat. No. 6,617,187 which is a divisional of U.S. patent application Ser. No. 09/047,658 filed 25 Mar. 1998, entitled Method for Fabricating an Electrically Addressable Silicon-On-Sapphire Light Valve, now U.S. Pat. No. 6,312,968; which is a continuation-in-part of U.S. patent application Ser. No. 08/301,170 filed 1 Sep. 1994, entitled Method for Fabricating Electrically Addressable Silicon-On-Sapphire Light Valve, now abandoned; which is a continuation-in-part of U.S. patent application Ser. No. 08/105,252 filed 4 Aug. 1993, entitled Ultra-high Resolution Liquid Crystal Display on Silicon-On-Sapphire, now abandoned which is a continuation-in-part of U.S. patent application Ser. No. 08/094,541 filed 30 Jun. 1993, now U.S. Patent No. 5,300,443.

BACKGROUND OF THE INVENTION

Liquid crystal displays are used in a wide variety of commercial applications including portable (laptop) computers, wristwatches, camcorders and large screen televisions. Liquid crystal light valves, used as spatial light modulators, may be used in projection systems as well as optical computing applications. Limitations inherent in the existing technology come from the necessity of fabricating the displays on transparent glass or quartz substrates which are not amenable to high quality electronic materials. Fabrication of displays on bulk silicon, although of high crystal quality, unnecessarily constrains the display to reflective mode schemes due to the opaque substrate and is not applicable to transmissive applications. The ability to integrate drive circuitry using thin-film transistors (TFTs) with liquid crystal displays has improved reliability and has allowed the use of this technology in lightweight, portable applications. However, the integration of display driving circuitry heretofore has been substantially limited to thin film transistor technology using amorphous (a-Si) or polycrystalline (p-Si) silicon deposited on the glass or quartz substrate. The intrinsic properties such as lattice and thermal mismatch between the silicon layer and the substrate, and the low temperature deposition techniques used in the a-Si and p-Si technologies result in a silicon layer with poor charge carrier mobility and crystallographic defects. These limitations are directly related to inferior electronic device performance and limitations when compared to bulk silicon.

Of particular importance for integrated display systems is the desire for higher density circuitry for ultra-high resolution display and light valve applications and for the monolithic integration of display driver circuitry and related signal processing circuitry on-chip. The characteristic lower (electrical and crystallographic) qualities of a-Si and p-Si materials result in poor fabrication yields when compared to conventional Very Large Scale Integration (VLSI) processing. Conventional techniques for overcoming this problem, inherent in the poorer quality amorphous or polycrystalline material, requires the use of redundant circuit elements in each pixel to ensure fully functional displays in a-Si and p-Si. Such redundancy requires a concomitant increase in the picture element (pixel) size thereby inhibiting the ability to scale displays and light valves to ultra-high resolution. The additional circuit elements also reduce the aperture ratio, i.e. the fraction of pixel area allowing transmitted light, thereby reducing the brightness of the display or light valve.

Furthermore, the low carrier mobility, low speed, low yield a-Si and p-Si materials are incompatible with VLSI design and fabrication techniques which would otherwise readily allow integration of video drivers, digital logic and other computational circuitry on-chip thereby offering designers greater functionality, higher reliability, and improved performance.

Thus, a need has been recognized for a liquid crystal display or light valve system which monolithically integrates an active matrix display with its associated drive and image processing circuitry.

SUMMARY OF THE INVENTION

A liquid crystal display includes: a) a sapphire substrate having a first crystal lattice structure; b) a single crystal silicon structure having a thickness no greater than about 100 nanometers affixed to the sapphire substrate to create a silicon-on-sapphire structure, and a second crystal lattice structure oriented by the first crystal lattice structure; c) an array of liquid crystal capacitors formed on the silicon-on-sapphire structure; and d) integrated self-aligned circuitry formed from the silicon layer which is operably coupled to modulate the liquid crystal capacitors. The liquid crystals capacitors may include nematic or ferroelectric liquid crystal material.

BRIEF DESCRIPTION OF THE DRAWINGS

Throughout the drawings, like elements are referenced using like designations.

DISCLOSURE OF THE PREFERRED EMBODIMENT

Figure 1:
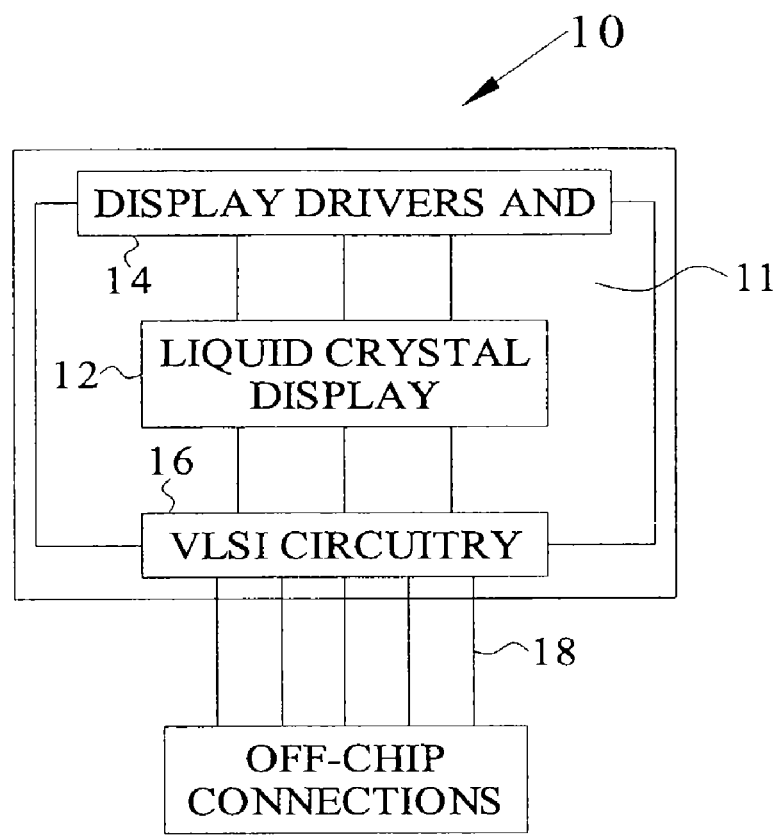
FIG. 1 schematically shows a liquid crystal display monolithically integrated with associated circuitry on an improved ultra-thin silicon-on-sapphire (UTSOS) wafer.

FIG. 1 schematically shows a top view of a display system 10 having a nematic liquid crystal display 12 monolithically integrated with associated circuitry 14 and 16 on an improved, ultra-thin silicon-on-sapphire (UTSOS) wafer. Display drivers 14 and very large scale integration (VLSI) circuitry 16 are used to address each of the individual pixels 20 and to apply appropriate voltages to modulate liquid crystal capacitor 24 to represent an image presented by liquid crystal display 12. Typically, display drivers 14 include shift registers, and clock circuitry. VLSI circuitry 16 may include image processing circuits, memory and buffer circuits, wireless interconnect circuitry and the like. A display area 12 in display or light valve system 10 has an array of one or more pixel elements which may be individually addressed so that display 12 presents an image for viewing or projection. By way of example, a 1000 pixel×1000 pixel display is described by way of example only. However, it is to be understood that the scope of the invention includes liquid crystal displays having any number of liquid crystals as may be required to suit the needs of a particular application.

Figure 2:
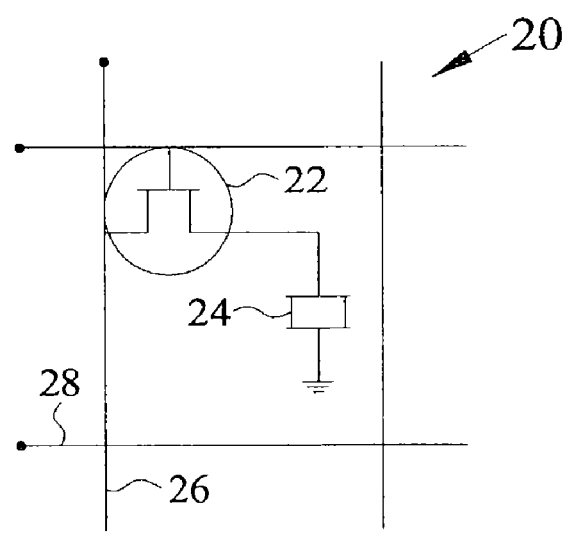
FIG. 2 shows the electrical schematic for a single picture element (pixel).
Figure 10:
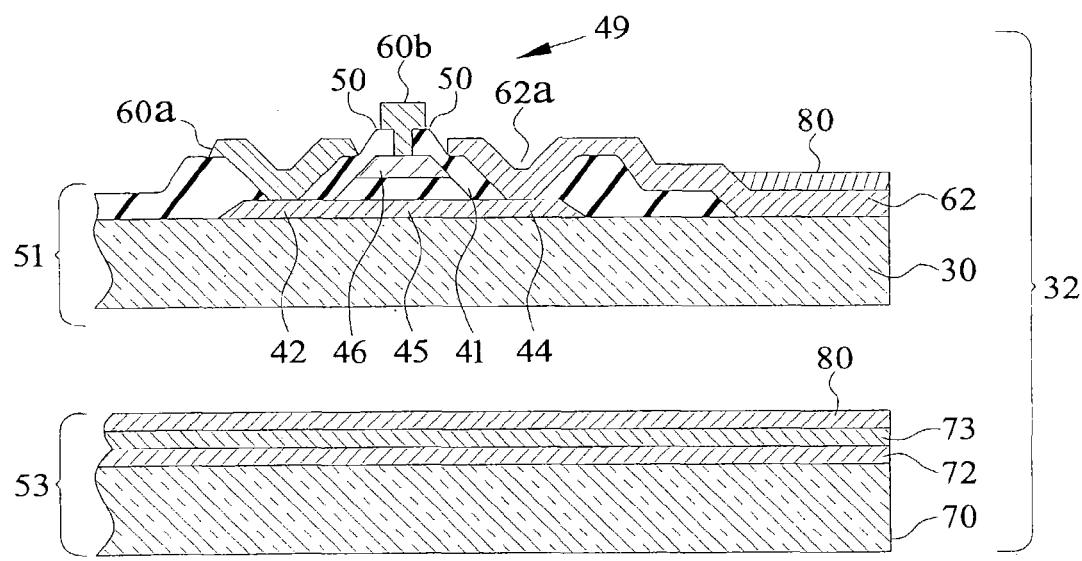
Figure 11:
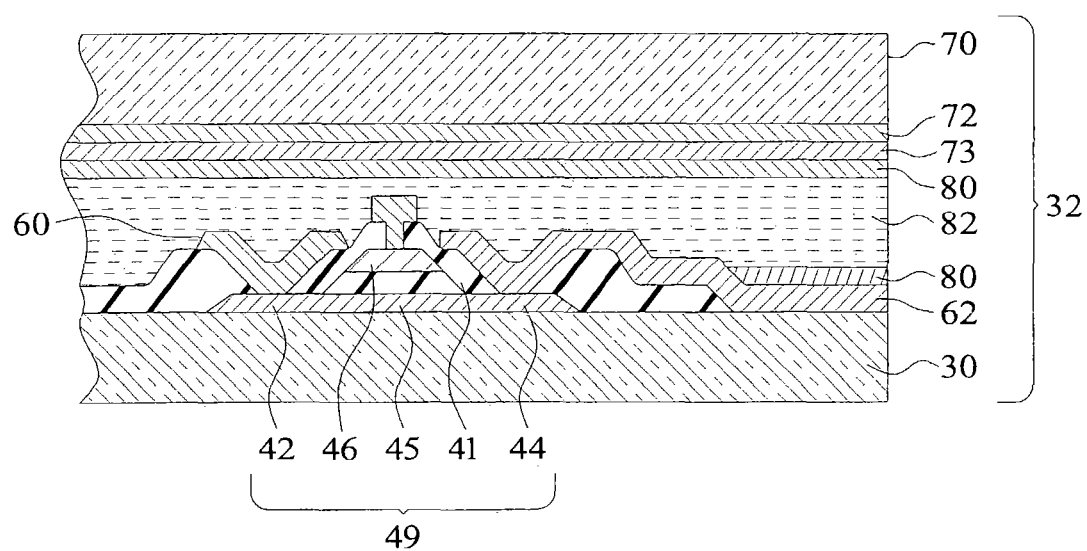
Figure 12:
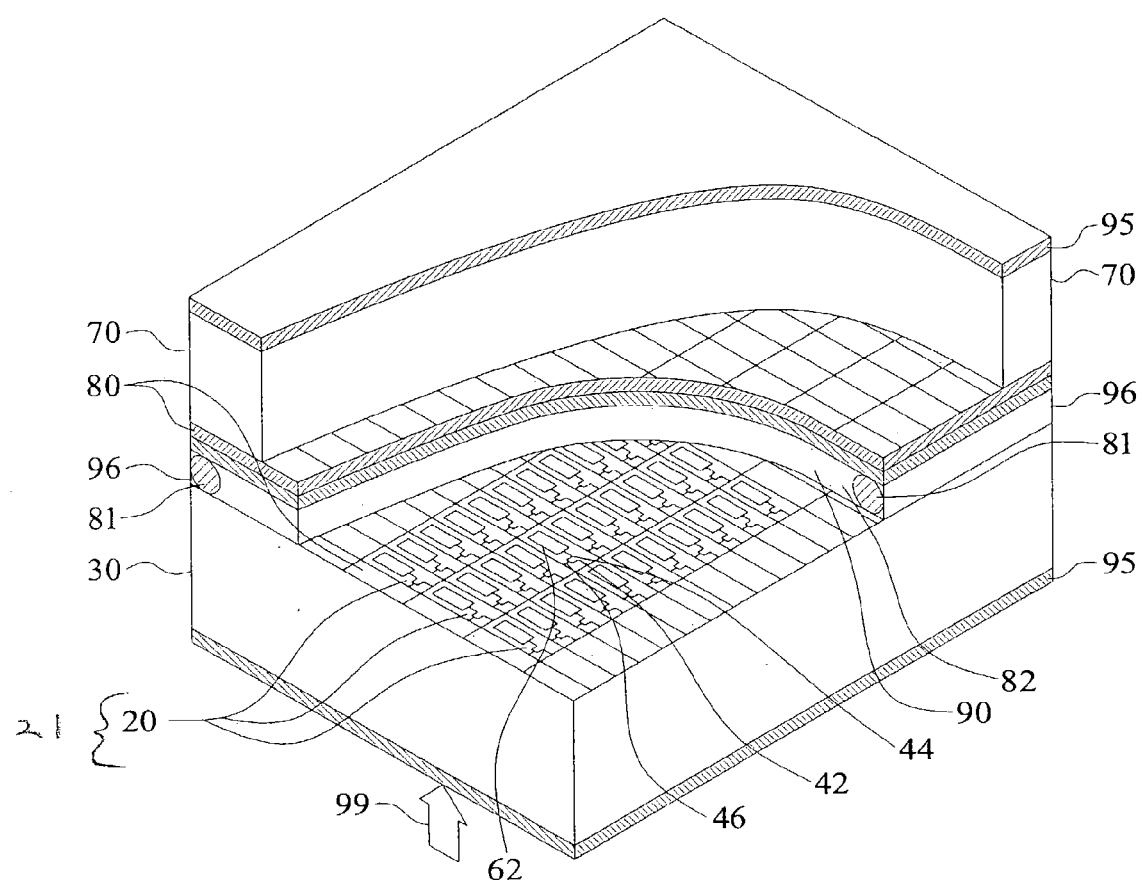

For purposes of illustrating the manufacture of a self-aligned liquid crystal display that embodies various features of the present invention, fabrication of one embodiment of a pixel element is described. Each pixel element may include a single nonlinear circuit element (self-aligned transistor) and a nematic liquid crystal capacitor. As detailed below, a plurality or multitude of such pixels may be configured and interconnected in an array with drive and image processing circuitry using standard photolithographic processesss. FIG. 2 shows an electrical schematic for a single liquid crystal display element 20 which includes a nonlinear circuit element 22, such as a MOSFET, and a single nematic liquid crystal capacitor 24. Metal column line 26 and polysilicide row line 28 are operably connected to bias the nonlinear circuit element 22 to vary the voltage of the nematic liquid crystal 24 to achieve a desired gray scale. FIGS. 10, 11, and 12 show the steps for fabricating a single liquid crystal display element 20 and non-linear circuit element 22.

Figure 3:
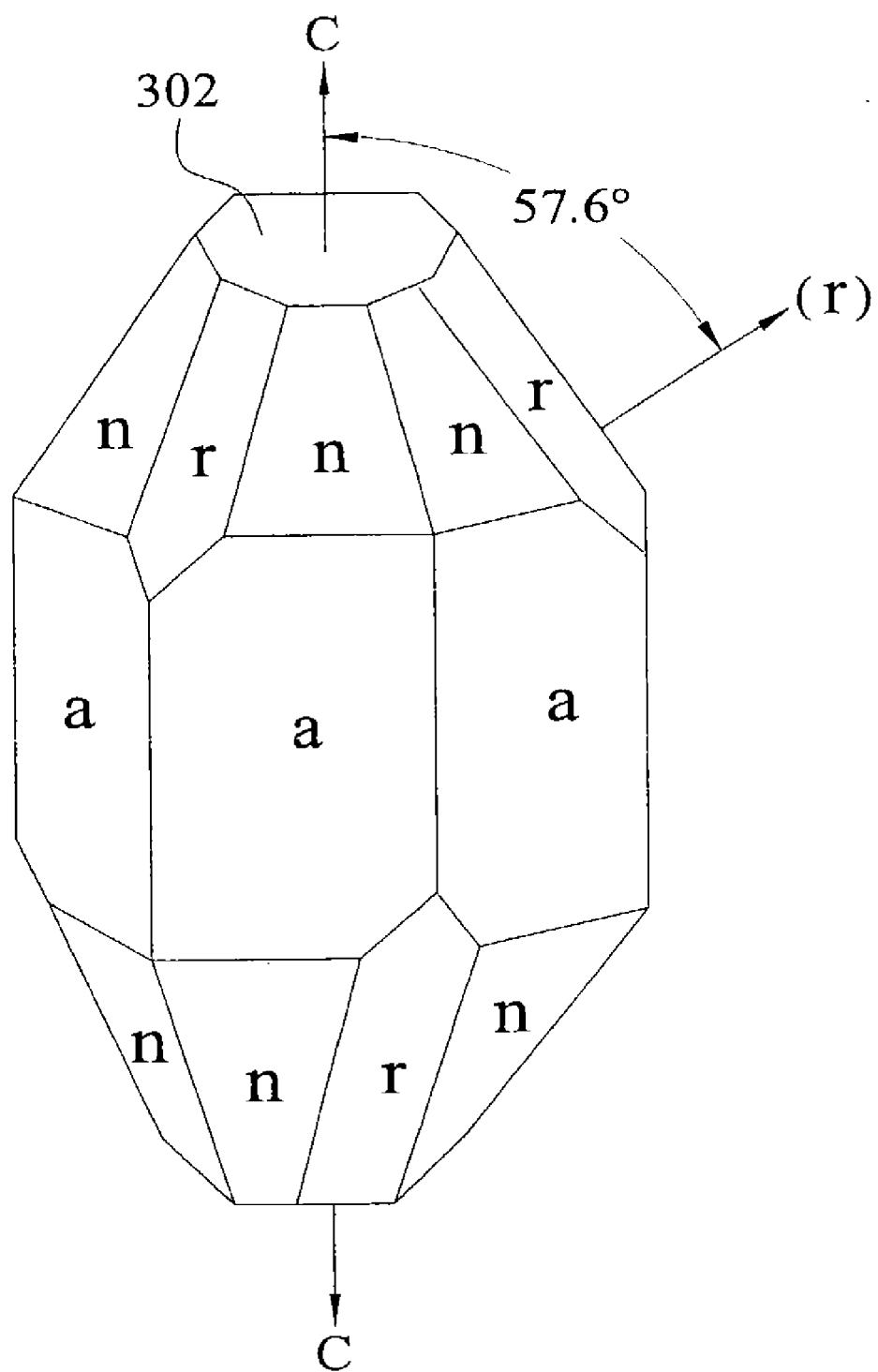
FIG. 3 shows the crystal structure of sapphire of an embodiment of the invention.

Referring to FIG. 3, a single crystal silicon layer 40 is affixed to a sapphire ($Al_2O_3$) substrate 30 to create a silicon-on-sapphire (SOS) wafer 32, where wafer 32 represents the various manufactured stages of the structure being fabricated into liquid crystal display 20. One method for affixing silicon layer 40 to sapphire substrate 30 is by epitaxial deposition of a single crystal layer of silicon onto sapphire substrate 30. Epitaxial deposition of single crystal silicon layer 40 may be achieved by thermal decomposition of silane onto sapphire substrate 30 in accordance with well known techniques.

Figure 4:
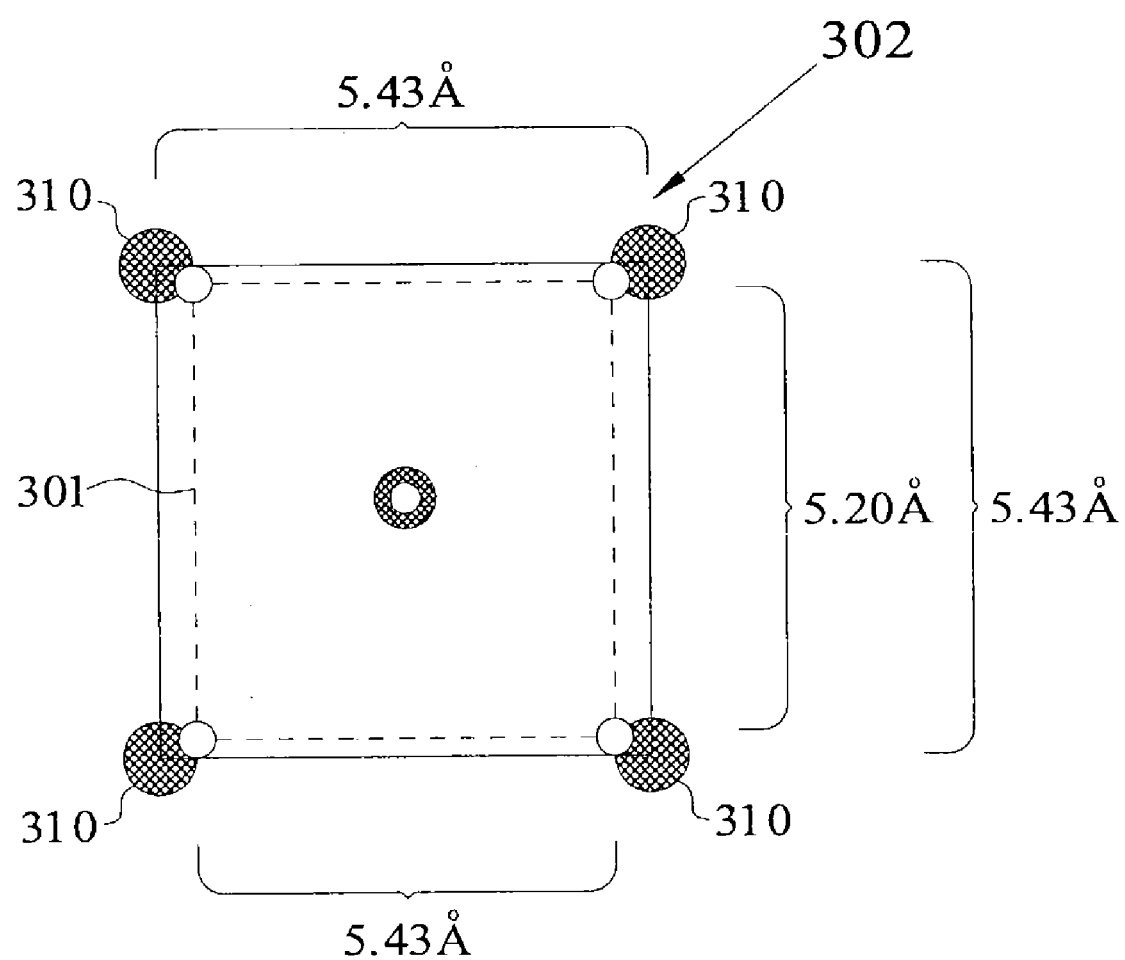
FIG. 4 shows a silicon crystal formed on the r-plane of the sapphire crystal shown in FIG. 3.

As shown in FIG. 4, a sapphire crystal 300 has a rhombohedral structure 302 with hexagonal symmetry along the c-axis. Due to the hexagonal symmetry, the sapphire crystal 300 is often described using hexagonal coordinates rather than the standard crystallographic Miller indices. Thus, the c-axis of sapphire is written as (0001). The crystalline structure of silicon and sapphire are not the same, therefore hetero-epitaxy of silicon on sapphire is not inherently plausible due to substantial crystalline, lattice and thermal expansion coefficient mismatch. However, thin films of single-crystal silicon have been fabricated on certain sapphire crystal planes that have a compatible, although not identical, crystal structure. Compatible crystal structures refer to a single crystal of a first material such as silicon that is capable of being formed on a single crystal of a second material such as sapphire. The r-plane of sapphire crystal 300, shown in FIG. 3 below, and denoted by ($1\bar{1}02$) is one type of crystal structure on which single crystal silicon may be grown. FIG. 4 schematically shows a top view of a (100)-oriented silicon layer 301 formed on r-plane sapphire crystal 300. The silicon layer 301 has a lattice spacing of 5.43 Å that includes silicon atoms 310. The relative lattice spacing of r-plane sapphire crystal 300, containing aluminum atoms 310 shows a lattice spacing of 4.75 Å along the ($11\bar{2}0$) direction and 5.20 Å along the ($\bar{1}101$) direction. Therefore, there ordinarily would be a lattice mismatch of 4.2% along the ($\bar{1}101$) direction and a lattice mismatch of 12.5% along the ($11\bar{2}0$) direction. Such a lattice mismatch and the thermal expansion mismatch between the sapphire crystal 300 and silicon crystal 301 lead to crystalline defects (twins and dislocations) in silicon layer 40 that detrimentally effect electronic device performance. The concentration of defects is much higher near the silicon/sapphire interface 34 and decreases in a direction into silicon layer 40, away from the silicon/sapphire interface 34. Thus, it is important to improve the quality of the silicon layer 40 in order to eliminate all or most of the defects in order to obtain a single crystal silicon layer or structure having optimized properties such as a low concentration of twin defects, threading dislocations, high charge carrier mobility, and longer carrier lifetime. An example of a process for improving the quality of the silicon layer 40 is known as solid phase epitaxial regrowth. Alternatively, single crystal silicon layer 40 may be made from a single crystal silicon structure may be bonded to sapphire substate 30, as described in commonly assigned U.S. Pat. No. 5,441,591.

Figure 5:
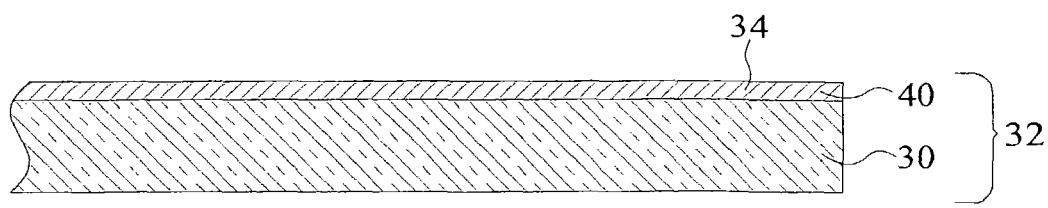
FIGS. 5–12 show the integrated fabrication process for a liquid crystal display and associated self-aligned circuitry that embodies various features of the present invention.

Referring to FIG. 5, sapphire ($Al_2O_3$) substrate 30 in the form of a wafer 32 commonly designated with r-plane orientation is affixed to a thin layer of single crystal, device quality silicon layer 40. One method of affixing substrate 30 to silicon layer 40 is by epitaxial deposition of silicon by thermal decomposition of silane and subsequent ion implantation and solid phase regrowth techniques. Sapphire substrate 30 may be affixed to silicon layer 40 by bonding as described in commonly assigned U.S. Pat. No. 5,441,591.

Silicon layer 40 then is ion implanted with $^{28}Si$ atoms (doses on the order of $10^{14}$ $cm^{-2}$ at 185 keV) into the near interfacial region of the silicon-sapphire interface 34 while the temperature of wafer 32 is maintained at −20 degrees C. Ion implanting other isotopes species of silicon such as $^{29}Si$ and $^{30}Si$ may also be employed in an embodiment of the invention. Species of substantially different masses such as ions or complexes of tin (Sn), germanium (Ge) or carbon (C) may also be used by appropriately varying the implant parameters.

Still referring to FIG. 5, after being ion-implanted, silicon layer 40, ergo wafer 32, is thermally soaked for about 30 minutes at 550 degrees C. and a thermal ramp° C., where after the temperature is ramped upwardly over the course of an hour from 550 degrees C550° C. to 900 degrees C. The silicon is then 900° C. Next, silicon layer 40 is thermally annealed at 900° C. in nitrogen for approximately one hour. A gradual anneal of silicon layer 40 allows the silicon layer 40 to regrow as a single crystal having minimal defects, and avoids subjecting the silicon layer 40 to thermal shock. Then silicon layer 40 is oxidized at 1000° C. which uniformly consumesin order for a portion of the epitaxial silicon layer 40 to transformed into oxide. The oxide is subsequently etched leaving a thinned epitaxial silicon layer having a generally uniform, reduced thickness to reduce the thickness of silicon layer 40. The oxidation and etch process can be repeated to obtain a layer of silicon layer 40 may be repeated as required until silicon layer 40 has a thickness generally in the range of about 30 to less than 100 nm thick (nominally 30 to 100 nm) of silicon. The thinned, i.e. an ultrathin film of single crystal device quality silicon on sapphire. This starting material forms the basis for the optical, mechanical, electrical and thermal advantages over the prior art. In particular, a salient feature resulting from the fabrication of the display in less than 100 nm thick silicon films rather than thick films (>100 nm) of silicon-on-sapphire as taught in the prior artsilicon layer 40 offers substantial improvement in absorption (i.e. increased brightness), resistance to heating, and parasitic photo excitedphotoexcited carriers compared to such properties of thicker silicon structures.

Figure 6:
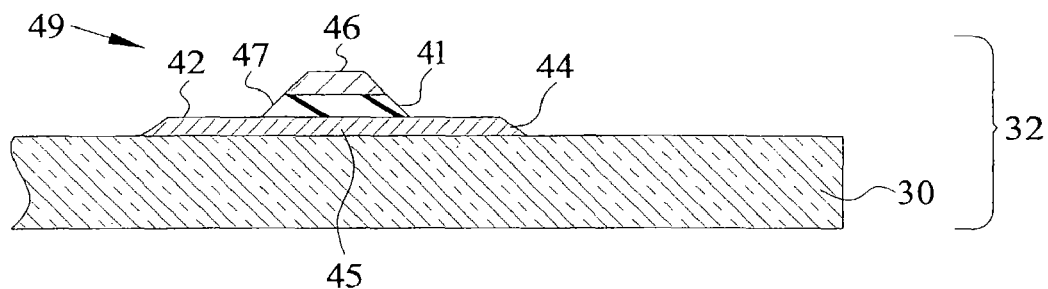

Referring next to FIG. 6, a single nonlinear circuit element 49, such as a MOSFET, is fabricated in each pixel on the thinned and patterned silicon layer 40 using well known photolithographic techniques to create the self-aligned MOSFET structure. Nonlinear circuit element 49 includes gate oxide 41, source region 42, drain region 44, channel region 45, gate electrode 46 and sidewall oxide 47. Source region 42, drain region 44, and channel region 45 are formed from patterned single crystal silicon layer 40. Source region 42 and drain region 44 are formed following the formation of gate electrode 46, and are therefore said to be "self-aligned" to the gate thereby reducing parasitic capacitance and improving the performance of the device and circuitry formed from such devices.

Figure 7:
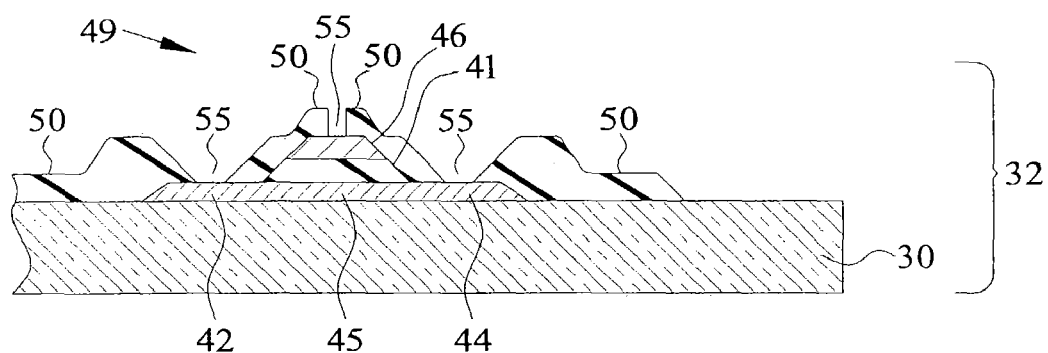

Referring to FIG. 7, the fabrication of pixel element 20, and particularly that of MOSFET structure 49 on wafer 32, continues by chemical vapor deposition (CVD) and selective etching of passivation oxide layer 50 onto wafer 32 is described. After formation of passivation oxide layer 50, contact holes 55 are patterned in passivation oxide layer 50 to expose selected areas of source region 42, drain region 44 and gate region (via gate electrode 46).

Figure 8:
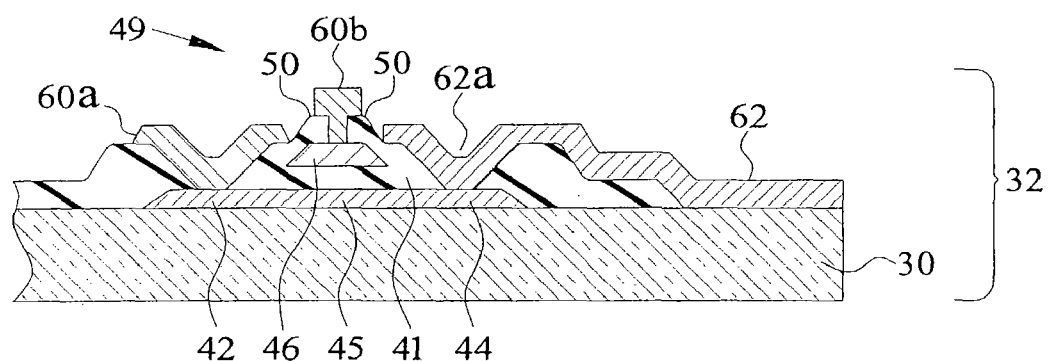

As shown in FIG. 8, depositing and patterning interconnect metallization layer 62 onto wafer 32 to create contacts 60a, 60b, and 62a to source region 42, gate electrode 46, and drain region 44, respectively to provide wafer 32 with the structure as shown. The interconnect metallization layer 62 may be fabricated using a multiple step process. For example, an aluminum alloy (99% Al:1% Si) may be deposited and patterned for all contacts including source contact 60a, gate contact 60b, and interconnections with silicon MOSFETs and related devices and circuits. A transparent conductive material such as indium tin oxide (ITO) may be subsequently deposited and patterned as a transparent drain contact 62a that also extends as a transparent nematic liquid crystal capacitor contact or electrode 62 for a nematic liquid crystal capacitor to be described, (the interconnect metallization also forms the output electrode from the MOSFET to pixel electrode 62). The transparent nematic liquid crystal capacitor electrode 62 may be employed when the display system 10 is used in a transmissive mode. However, for a reflective mode display or light-valve system, the nematic liquid crystal capacitor electrode may be an opaque metal (such as Al or 99% Al:1% Si) as this forms a back reflector for the system.

Figure 9:
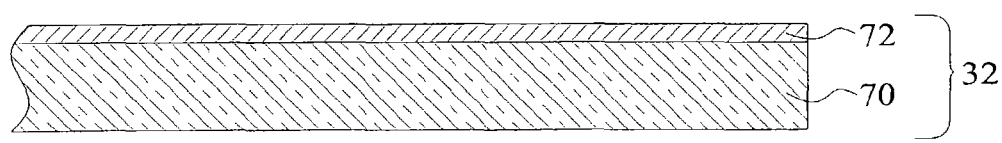

At this stage, the monolithically integrated, self-aligned liquid crystal display 12, display drivers 14 and VLSI circuitry 16, including the non-linear circuit element 22 within the each pixel 20 are completely fabricated and may, if desired, be covered with additional passivation, shielding or planarization layers useful in certain applications. For example, as shown in FIG. 9, a transparent substrate 70, e.g. sapphire, quartz, fused silica or glass, may be covered with a transparent metallized counter electrode 72, and appropriately patterned Counter electrode 72 is normally common for the pixels 20 of crystal display 12 which are shown to be arranged in an array 21 as shown in FIG. 12.

Referring to FIG. 10, wafer structure 32 now includes wafer subassemblies 51 and 53. Pixel 20 may be fabricated to provide a colored display by attachment of a suitably colored optical filter layer 73 to counter electrode 72. Next, alignment layers 80 then may be formed on filter layer 73 to pin one end of liquid crystal 82 to surface of alignment layer 80 to allow uniform rotation of the liquid crystal 82 when subjected to a voltage bias, therefore uniformly affecting the retardation of the polarized light that is transmitted through the liquid crystal capacitor 24. Formation of alignment layer 80 may be achieved by depositing a thin polyimide layer 80 on, inter alia, optical filter layer 73 and pixel electrode 62 which is subsequently mechanically rubbed to obtain a preferred orientation for the liquid crystal media.

A method for spacing each pixel electrode 62 from counter electrode 72 may employ fiber glass spacer rods or beads 81 (FIG. 12) to form a cavity between structures 51 and 53 (FIG. 10). Spacer rods 81 normally lie at the periphery of wafer 32. Referring to FIGS. 11 and 12, final assembly of liquid crystal display 10 may be accomplished by aligning and positioning substrate 30 with respect to substrate 70 so as to form a cavity 82 which is filled with a desired liquid crystal material 90 such as a nematic liquid crystal material or a ferroelectric crystal material. Cavity 82 then may be hermetically sealed or plugged with flat closures 96.

Referring still to FIG. 12, affixing appropriately oriented polarizers 95 to transparent substrate 70 completes the fabrication of the monolithic liquid crystal display system 10, which as shown in FIG. 12, includes pixel elements 20 arranged in an array.

Obviously, numerous modifications and variations of the present invention are possible in light of the above teachings. It is therefore understood that within the scope of the appended claims the invention may be practiced otherwise than as specifically described herein.

We claim:

1. A liquid crystal display, comprising:
    a sapphire substrate having a first crystal lattice structure;
    a single crystal silicon structure having a thickness no greater than about 100 nanometers affixed to said sapphire substrate to create a silicon-on-sapphire structure, and a second crystal lattice structure oriented by said first crystal lattice structure;
    an array of liquid crystal capacitors formed on said silicon-on-sapphire structure; and
    integrated self-aligned circuitry formed from said silicon layer which is operably coupled to modulate said liquid crystal capacitors.

2. The liquid crystal display of claim 1 wherein said sapphire substrate has an r-plane orientation and said single crystal silicon structure has a (100)-orientation.

3. The liquid crystal display of claim 1 wherein each of said liquid crystal capacitors is coupled to a transistor formed on said silicon-on-sapphire substrate.

4. The liquid crystal display of claim 3 wherein each of said liquid crystal capacitors is a nematic liquid crystal capacitor.

5. The liquid crystal display of claim 4 wherein said liquid crystal capacitor provides a reflective pixel element.

6. The liquid crystal display of claim 4 wherein said liquid crystal capacitor provides a pixel element that is transmissible to light.

7. The liquid crystal display of claim 1 wherein each of said liquid crystal capacitors is a ferroelectric liquid crystal capacitor.

8. The liquid crystal display of claim 7 wherein said liquid crystal capacitor provides a reflective pixel element.

9. The liquid crystal display of claim 7 wherein said liquid crystal capacitor provides a pixel element that is transmissible to light.

10. A method for fabricating a monolithically integrated liquid crystal array display and control circuitry on a silicon-on-sapphire structure, comprising the steps of:
    a) affixing a sapphire substrate having a first crystal lattice structure to a single crystal silicon structure having a thickness no greater than about 100 nanometers and a second crystal lattice structure oriented by said first crystal lattice structure to create a silicon-on-sapphire structure;

b) ion implanting said single crystal silicon structure with a species selected from the group consisting of silicon ions, tin ions, germanium ions, and carbon ions to create an ion implanted silicon layer;

c) annealing said silicon-on sapphire structure;

d) oxidizing said ion implanted silicon layer to form a silicon dioxide layer from a portion of said silicon layer so that a thinned, ion implanted silicon layer remains;

e) removing said silicon dioxide layer to expose said thinned ion implanted silicon layer;

f) fabricating transistors wherein each of said transistors is formed by patterning said thinned ion implanted silicon layer to create a patterned silicon layer, growing a gate oxide on said patterned silicon layer; forming a polysilicon layer over said silicon-on sapphire structure; doping said polysilicon layer; patterning said polysilicon layer and said gate oxide to form a gate region and to expose selected regions of said thinned, ion-implanted silicon layer; ion implanting said selected regions of said epitaxial silicon layer to create source and drain regions in said thinned, ion-implanted silicon layer that are self-aligned with said gate region;

g) fabricating electrical contacts that are electrically connected to said transistors; and h) fabricating liquid crystal capacitors on said silicon-on sapphire structure that are electrically connected to said transistors by said electrical contacts.

11. The method of claim 10 wherein said sapphire substrate has an r-plane orientation and said single crystal silicon structure has a (100)-orientation.

12. The method of claim 10 wherein said transistors include nonlinear circuit elements.

13. The method of claim 10 wherein said liquid crystal capacitors include nematic liquid crystal capacitors.

14. The method of claim 10 wherein said liquid crystal capacitors include ferroelectric liquid crystal capacitors.

15. The method of claim 10 further includes fabricating polarizers on said silicon-on-sapphire structure.

16. The method of claim 10 further includes forming a layer of optical filters on said silicon-on sapphire structure.

17. The method of claim 10 includes the steps of:

implanting said silicon ions at a dosage of about 1014 cm-2, at an energy level of about 185 keV and, at a temperature of about $-20/C$;

immersing said silicon-on-sapphire structure in a nitrogen atmosphere having a temperature of about 550/C for approximately 30 minutes;

increasing the temperature of said nitrogen atmosphere in which said silicon-on-sapphire structure is immersed from about 550/C to about 900/C in about one hour;

annealing said silicon-on sapphire structure in said nitrogen atmosphere for about one hour at 900/C; and oxidizing said silicon layer in an oxygen atmosphere having a temperature of about 1000/C.

* * * * *